(12) United States Patent  
Butler

(10) Patent No.: US 7,538,589 B2
(45) Date of Patent: May 26, 2009

(54) CABLE DRIVER USING SIGNAL DETECT TO CONTROL INPUT STAGE OFFSET

(75) Inventor: Robert Karl Butler, Issaquah, WA (US)

(73) Assignee: National Semiconductor Corporation, Santa Clara, CA (US)

(*) Notice: Subject to any disclaimer, the term of this patent is extended or adjusted under 35 U.S.C. 154(b) by 7 days.

(21) Appl. No.: 11/924,565

(22) Filed: Oct. 25, 2007

(65) Prior Publication Data

US 2009/0108906 A1    Apr. 30, 2009

(51) Int. Cl.
*H03K 3/00* (2006.01)
(52) U.S. Cl. .......................... 327/108; 326/30
(58) Field of Classification Search ............... 327/108; 326/30
See application file for complete search history.

(56) References Cited

U.S. PATENT DOCUMENTS 5,910,731 A * 6/1999 Polczynski .................. 326/30

FOREIGN PATENT DOCUMENTS

| KR | 10-1999-0033649 | 5/1999 |
| KR | 10-2003-0069063 | 8/2003 |
| KR | 10-2005-0011760 | 1/2005 |

OTHER PUBLICATIONS

PCT/US2008/08113 International Search Report, mailed Feb. 24, 2009.

* cited by examiner

*Primary Examiner*—Kenneth B. Wells
(74) *Attorney, Agent, or Firm*—Merchant & Gould P.C.

(57) ABSTRACT

A system, apparatus and method are arranged for monitoring an input signal for a line driver and determining if a valid data signal is present. When the input signal is determined to be an invalid data signal, an offset is introduced into the input stage of the line driver to prevent noise induced toggling of the output of the line driver. When the input signal is determined to be a valid data signal, the offset is removed from the input stage since inclusion of the offset can introduce undesirable duty cycle distortion in the output of the line driver. By dynamically adding or removing the offset from the input stage of the line driver, invalid signals are prevented from toggling the output of the line driver while preserving a clean data transmission for valid signals.

20 Claims, 5 Drawing Sheets

CABLE DRIVER USING SIGNAL DETECT TO CONTROL INPUT STAGE OFFSET

FIELD OF INVENTION

The present description relates to a system, method and apparatus for monitoring and testing the validity of an input signal to a line driver such as a cable line driver. More particularly, the present disclosure details that an offset can be dynamically added to an input stage of a line driver so that unwanted toggling of the output of the line driver is prevented for invalid signals.

BACKGROUND

Recent advances in video broadcasting technology have lead to increased interest in high resolution displays. For example, high-definition television (HDTV) systems have significantly higher resolution than traditional standard definition (SD) broadcast formats such as the National Television System Committee (NTSC) format, the Sequential Color with Memory (SECAM) format, and the Phase Alternating Line (PAL) format. The HDTV format is available in a number of different display resolutions including 1280×720 pixels and 1920×1080 pixels with a large palette of colors.

The increased video resolution in HDTV is of no benefit unless the signals can be successfully transmitted and received by the television. Since high resolution signals require a large amount of data to be transmitted in a short period of time, increased transmission speeds and increased bandwidth requirements are imposed on the broadcasting system. Although a variety of compression technologies can be employed such as MPEG-2 to reduce the overall bandwidth requirements on the broadcast system, the compressed signals must still be transmitted and received with as little distortion as possible.

A typical broadcast system includes a video production and distribution center that multiplexes and transports video signals for reception by a subscriber via a set-top box. In video broadcast systems, a real-time switcher is needed so that local content such as commercials can be inserted into video programming. Line driver circuits are used to transmit the signals at high data rates (e.g., up to 3 Gbps) such as when HDTV signals are transmitted over 75 ohm transmission lines. The line driver circuits can be used in the broadcast system for routing and switching of the video signals, as well as in the distribution of the video signals.

DETAILED DESCRIPTION

Figure 1:
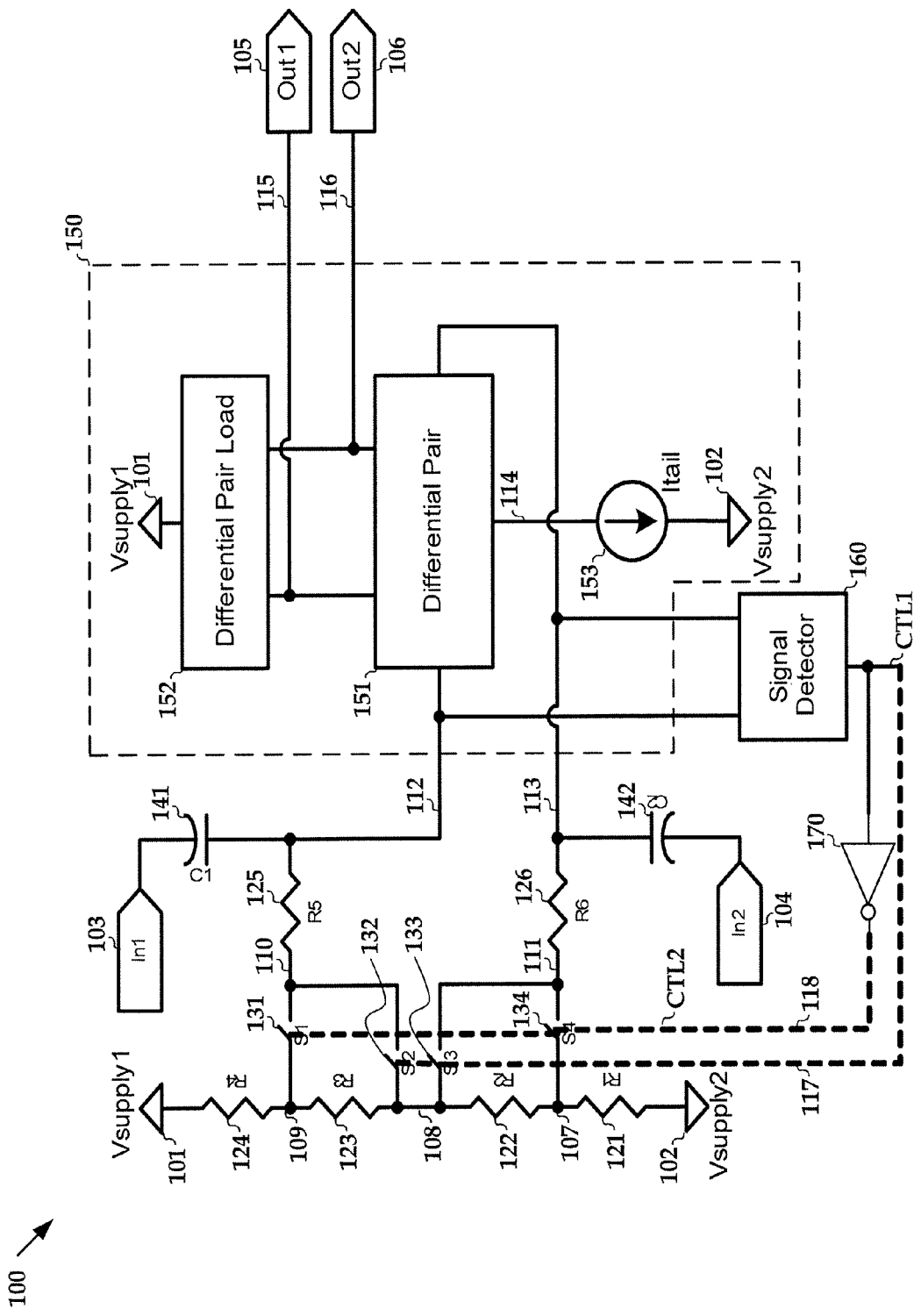
FIG. 1 is a schematic diagram that illustrates an example line driver circuit that employs a dynamic offset arrangement.

Various embodiments will be described in detail with reference to the drawings, where like reference numerals represent like parts and assemblies throughout the several views. References to various embodiments do not limit the scope of the invention, which is limited only by the scope of the claims attached hereto. Additionally, any examples set forth in this specification are not intended to be limiting and merely set forth some of the many possible embodiments for the claimed invention.

Throughout the specification and claims, the following terms take at least the meanings explicitly associated herein, unless the context clearly dictates otherwise. The meanings identified below are not intended to limit the terms, but merely provide illustrative examples for use of the terms. The meaning of "a," "an," and "the" may include reference to both the singular and the plural. The meaning of "in" may include "in" and "on." The term "connected" may mean a direct electrical, electro-magnetic, mechanical, logical, or other connection between the items connected, without any electrical, mechanical, logical or other intermediary items. The term "coupled" can mean a direct connection between items, an indirect connection through one or more intermediaries, or communication between items in a manner that may not constitute a physical connection. The term "circuit" can mean a single component or a plurality of components, active and/or passive, discrete or integrated, that are coupled together to provide a desired function. The term "signal" can mean at least one current, voltage, charge, data or other such identifiable quantity including electrically coupled and magnetically coupled signals.

Briefly stated, the present disclosure relates to a system, apparatus and method for monitoring an input signal for a line driver and determining if a valid data signal is present. When the input signal is determined to be an invalid data signal, an offset is introduced into the input stage of the line driver to prevent noise induced toggling of the output of the line driver. When the input signal is determined to be a valid data signal, the offset is removed from the input stage since inclusion of the offset can introduce undesirable duty cycle distortion in the output of the line driver. By dynamically adding or removing the offset from the input stage of the line driver, invalid signals are prevented from toggling the output of the line driver while preserving a clean data transmission for valid signals.

First Example Line Driver

FIG. 1 is a schematic diagram that illustrates an example line driver circuit (140) that employs a dynamic offset arrangement in accordance with at least some aspects of the present disclosure. Line driver circuit 100 includes six resistor circuits (121-126), four switching circuits (131-134), two capacitor circuits (141-142), an amplifier circuit (150), a signal detector circuit (160), and an optional logic circuit (170).

Resistor circuit R1 (121) is coupled between nodes 107 and 102. Resistor circuit R2 (122) is coupled between nodes 108 and 107. Resistor circuit (R3) 123 is coupled between nodes 109 and 108. Resistor circuit R4 (124) is coupled between nodes 101 and 109. Resistor circuit R5 (125) is coupled between nodes 110 and 112. Resistor circuit R6 (126) is coupled between nodes 111 and 113. Switching circuit 131 (S1) is coupled between nodes 109 and 110, and includes a control terminal that is coupled to node 118. Switching circuit 132 (S2) is coupled between nodes 108 and 110, and includes a control terminal that is coupled to node 117. Switching circuit 133 (S3) is coupled between nodes 108 and 111, and includes a control terminal that is coupled to node 117. Switching circuit 134 (S4) is coupled between nodes 107 and 111, and includes a control terminal that is coupled to node 118. Capacitor circuit C1 (141) is coupled between nodes 103 and 112. Capacitor circuit C2 (142) is coupled between nodes 104 and 113. Amplifier circuit 150 includes a first input terminal that is coupled to node 112, a second input terminal that is coupled to node 113, a first output terminal that is coupled to node 105, and a second output terminal that is coupled to node 106. Signal detector circuit 160 includes a first input terminal that is coupled to node 112, a second input terminal that is coupled to node 113, and an output terminal that is coupled to node 117.

The optional logic circuit (170), which in this example is illustrated as an inverter circuit, includes an input terminal that is coupled to node 117 and an output terminal that is coupled to node 118. Although depicted as a simple inverter circuit, the optional logic circuit (170) is not so limited and can thus be implemented as any appropriate logic function, including at least one member of the group comprising: a buffer, an inverter, a NAND logic gate, a NOR logic gate, an AND logic gate, an OR logic gate, an XOR logic gate, or an XNOR logic gate, to name a few examples.

Amplifier circuit 150 includes a differential pair (151), a differential pair load (152), and a current source (153). Differential pair 151 includes a first input terminal that is coupled to node 112, a second input terminal that is coupled to node 113, a first output terminal that is coupled to node 105, a second output terminal that is coupled to node 106, and a common terminal that is coupled to node 114. Differential pair load 152 includes a first input terminal that is coupled to node 105, a second input terminal that is coupled to node 106, and a power terminal that is coupled to node 101. Current source 153 includes an output terminal that is coupled to node 114, and a power terminal that is coupled to node 102.

In operation, a first power supply voltage (VSupply1) is coupled to node 101, while a second power supply voltage (Vsupply2) is coupled to node 102, and a differential input signal (IN1, IN2) is applied across nodes 103 and 104. The differential input signal (IN1, IN2) is coupled to the input of the amplifier circuit at nodes 112 and 113 via capacitor circuits 141 and 142. The amplifier circuit (150) is arranged to generate a differential output signal (OUT1, OUT2) at nodes 105 and 106 in response to the differential input signal (IN1, IN2) from nodes 112 and 113.

In one example, the amplifier circuit is arranged as a single stage amplifier circuit that includes a differential pair (151) that is arranged in cooperation with a differential pair load (152) and a current source (153) as depicted in FIG. 1. However, the amplifier circuit of FIG. 1 is merely one example and other amplifier circuits are also contemplated including multi-stage amplifiers that include cascade amplifier arrangements and/or cascode amplifier arrangements as may be desired. The output of the first stage is coupled to nodes 105 and 106, which are then coupled to the remainder of the line driver data path through other blocks in the line driver (not shown) which are eventually couple to the output differential pins of the line driver (e.g., see FIG. 5). The circuit board that this cable driver is mounted upon has a parasitic coupling effect (see FIG. 5) from the output signal lines back to the differential inputs.

DC operating voltages for the inputs of amplifier circuit (150) are generated by a voltage divider circuit that is formed by resistor circuits 121-124, which are arranged as a resistor ladder-type voltage divider that is coupled between the power supply voltages Vsupply1 and Vsupply2. Tap-points in the voltage divider are formed at the junction between the resistor circuits (121-124), which are used to provide the DC operating voltages for the amplifier circuit (140). The DC operating voltages are illustrated as resistively coupled via resistor circuits 125 and 126 to each input terminal (112, 113) of the amplifier circuit (150), but such resistors (125, 126) can be eliminated in some implementations.

A first portion of the DC operating voltages is coupled to node 112 through a first set of switching circuits (131, 132) via resistor circuit 125. A second portion of the DC operating voltages is coupled to node 113 through a second set of switching circuits (133, 134) via resistor circuit 126. Switching circuits 131-134 are arranged to select the DC operating voltages for the amplifier circuit in response to signals CTL1 and optionally CTL2, which are generated by the signal detector circuit (160).

The signal detector circuit (160) is arranged to monitor the input terminals of the amplifier circuit (150) at nodes 112 and 113. The signal detector circuit (160) generates an output signal (CTL) at node 117 that is responsive to the input signals (IN1, IN2) from nodes 112 and 113. The input signals (IN1, IN2) are AC coupled through capacitor circuits C1 and C2, which superimposes the input signals (IN1, IN2) on the selected DC operating voltages.

When valid signals are detected by the signal detector circuit (160), one or more control signals (e.g., CTL1 and/or CTL2) are generated to activate switching circuits S2 and S3 and deactivate switching circuits S1 and S4. This in effect couples the DC voltage from the center of the resistive ladder circuit at node 108 to both input terminals (112, 113) of the amplifier circuit (150). When both input terminals of the amplifier circuit have the same DC operating voltage (or common mode voltage) there is no offset introduced into the input signal and the output of the line driver circuit will ideally have a symmetrical duty cycle.

When invalid signals are detected (e.g., no signal is present) by the signal detector circuit (160), the one or more control signals (e.g., CTL1 and/or CTL2) are used to deactivate switching circuits S2 and S3 and activate switching circuits S1 and S4. This in effect couples the DC voltage from node 109 to node 112, and the DC voltage from node 107 to node 113. Since the voltages at node 109 and 107 are not equal to one another, the input terminals of the amplifier circuit will have different DC operating voltage where an offset is introduced into the input signal. The offset can either be symmetrical about the voltage at node 108 or non-symmetrical depending on the effective resistance for resistor circuits 121-124. The introduced offset changes the operation of the amplifier circuit (150) so that a much larger noise signal is required to cause the differential pair to switch.

Without the above described dynamic offset adjustment to the input signal of the amplifier circuit, noise can be coupled into the inputs that will cause the output of the first stage amplifier circuit to fully switch even when no input signal is present. Increased gain to the undesired switching can then occur in the next stage of the amplifier circuit, which can then result in undesired switching of the output signal at the output of the line driver.

The use of a static offset voltage at the input of the amplifier circuit was explored in contemplation of the present disclosure. However, although a static offset will prevent self oscillation of the line driver, the static offset also introduces duty cycle distortion in the resulting output signal. At high data rates (e.g., MHz and greater switching speeds), the resulting duty cycle distortion is unacceptable. The described arrangement, which includes dynamic offset generation with the signal detector circuit (160), effectively allows the best of oscillation prevention without introducing duty cycle distortion at high data rates.

An additional benefit of improved system fault detection can also be realized through the placement of the signal detector circuit (160) at the input of the line driver circuit since the fault detection signal (e.g., the output of the signal detector circuit (160) can be used as a fault detection signal) can be provided to the system outside of the line driver itself. When the system (e.g., see FIG. 5) switches channels to a line driver where no valid signal is detected, the system can infer that a fault condition has occurred and can react accordingly.

The depicted resistor ladder circuit formed by resistor circuits 121-124 works in conjunction with the switching circuits (131-134) to operate as an offset generator circuit. The offset generator circuit is responsive to the control signal or signals that are provided by the signal detector circuit (160). In some examples, an offset may be introduced at one node of the input terminals of the amplifier circuit (140), while in other examples offsets are introduced at both of the input terminals of the amplifier circuit (140). In some other examples (e.g., see FIG. 2), the offset is applied at the output of the amplifier circuit instead of at the input.

Although the above described circuits utilize a resistor ladder circuit topology to generate the DC operating voltages and offsets for the amplifier circuit (150), any other appropriate circuit topology may be used. In some examples, a DC voltage regulator can be used to generate at least one of the operating voltages such as via a series or shunt voltage regulator. The DC voltage regulator can either provide a multiplicity of output voltages, or a single output reference voltage that can then be divided into any necessary voltages by tap-points in a voltage divider circuit (e.g., a resistor ladder). In some other examples, a bandgap voltage reference or a vbe multiplier (base-emitter voltage multiplier) can be used to generate a reference voltage for the DC operating voltages. In some other examples, a voltage divider circuit can be implemented as a diode based divider circuit. In still other examples, a mixed resistor-diode ladder circuit may be used. The DC operating voltage may also be set external to the line driver circuit in some implementations. In some implementations, a voltage doubler can be used to generate the DC operating voltage for the inputs of the amplifier circuit (150). In some other implementation, a resistor can be coupled from Vsupply1 to a digital-to-analog converter (DAC) that can then be used to create the operating/offset voltages.

The various switching circuits may be implemented in any reasonable manner including transistor based switching circuits. In one example, a field effect transistor (FET) such as a metal-oxide semiconductor FET (MOSFET) or a junction FET (JFET) is configured to couple signals between the drain and source terminals in response to the application of a control signal at the gate terminal. The FETs can be implemented as N-type transistors (e.g., NMOS or N-JFET), P-type transistors (PMOS or P-JFET) or a complementary pair of transistors (e.g., CMOS) arranged as a transmission gate. Bipolar junction transistor (BJT) topologies are also contemplated in a similar manner.

The signal detector circuit (160) can be comprised of any variety of signal detection circuit that is capable of detecting the presence of a valid signal. In some examples, the signal detection circuit is comprised of an energy detection circuit. In some other examples, the signal detection circuit includes a filtering circuit such as a band-pass filter, a low pass filter or a high pass filter. In still other examples, the signal detection circuit may include a peak detection circuit. In still further examples, a combination of circuits is employed as a signal detector circuit including any one of: an energy detection circuit, a filter circuit, or a peak detector circuit.

Second Example Line Driver

Figure 2:
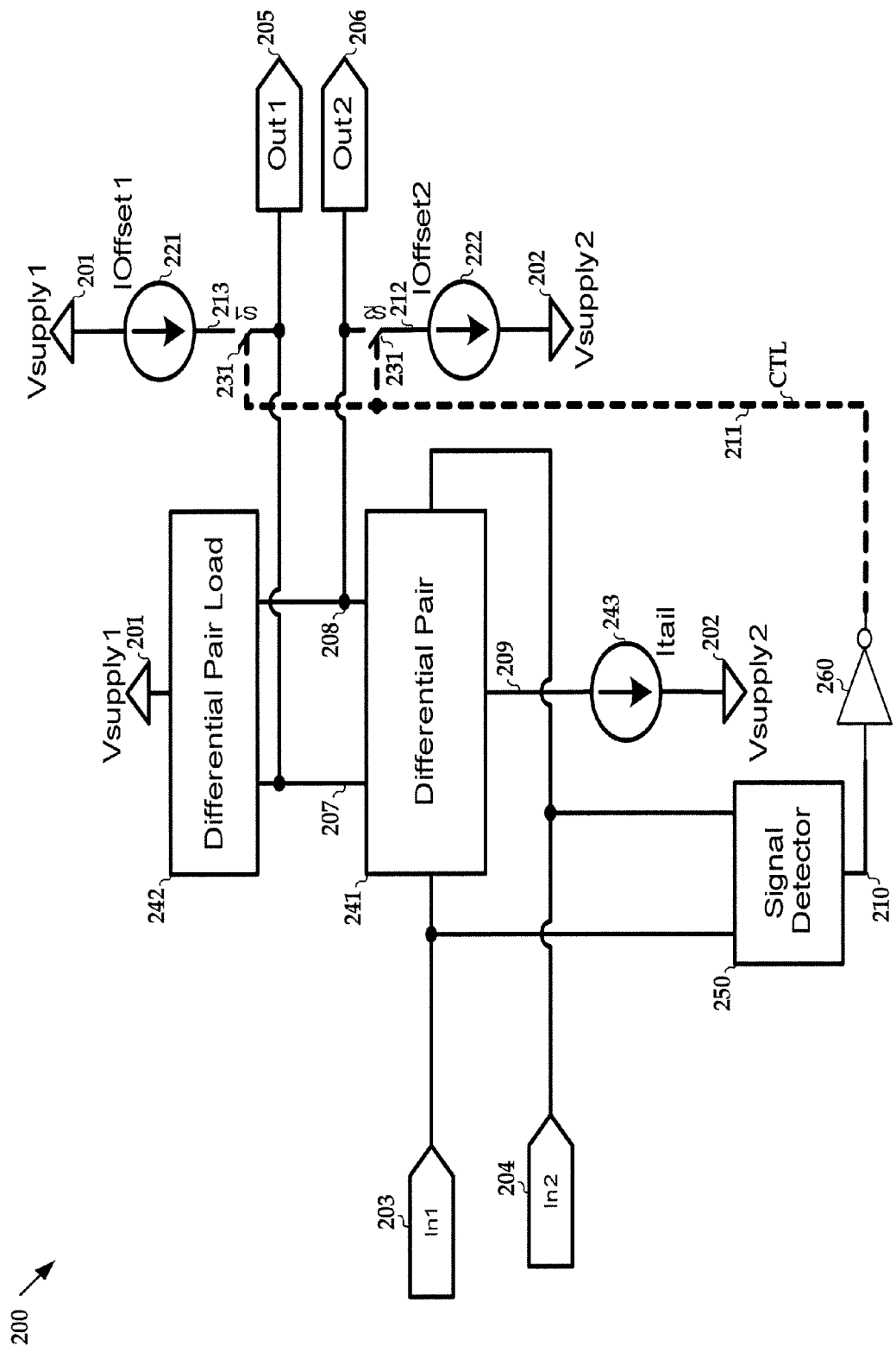
FIG. 2 is a schematic diagram that illustrates another example line driver circuit that employs a dynamic offset arrangement.

FIG. 2 is a schematic diagram that illustrates another example line driver circuit (200) that employs a dynamic offset arrangement in accordance with at least some aspects of the present disclosure. Line driver circuit 200 includes two current source circuits (221, 222), two switching circuits (231-232), an amplifier circuit (240), a signal detector circuit (250), and an optional logic circuit (260).

Current source circuit 221 is coupled between nodes 201 and 213 and has an operating current that corresponds to IOffset1. Current source circuit 222 is coupled between nodes 212 and 202, and has an operating current that corresponds to IOffset2. Switching circuit 231 (S1) is coupled between nodes 213 and 205, and includes a control terminal that is coupled to node 211. Switching circuit 232 (S2) is coupled between nodes 206 and 212, and includes a control terminal that is coupled to node 211. Amplifier circuit 240 includes a first input terminal that is coupled to node 203, a second input terminal that is coupled to node 204, a first output terminal that is coupled to node 205, and a second output terminal that is coupled to node 206. Signal detector circuit 250 includes a first input terminal that is coupled to node 203, a second input terminal that is coupled to node 204, and an output terminal that is coupled to node 210.

The optional logic circuit (260), which in this example is illustrated as an inverter circuit, includes an input terminal that is coupled to node 210 and an output terminal that is coupled to node 211. Although depicted as a simple inverter circuit, the optional logic circuit (260) is not so limited and can thus be implemented as any appropriate logic function, including at least one member of the group comprising: a buffer, an inverter, a NAND logic gate, a NOR logic gate, an AND logic gate, an OR logic gate, an XOR logic gate, or an XNOR logic gate, to name a few examples. In some examples the optional logic circuit (260) may be eliminated.

Amplifier circuit 240 includes a differential pair (241), a differential pair load (242), and a current source (243). Differential pair 241 includes a first input terminal that is coupled to node 203, a second input terminal that is coupled to node 204, a first output terminal that is coupled to node 205, a second output terminal that is coupled to node 206, and a common terminal that is coupled to node 209. Differential pair load 242 includes a first input terminal that is coupled to node 205, a second input terminal that is coupled to node 206, and a power terminal that is coupled to node 201. Current source 243 is coupled between nodes 209 and 202, and has an operating current that corresponds to Itail.

In operation, a first power supply voltage (VSupply1) is coupled to node 201, while a second power supply voltage (Vsupply2) is coupled to node 202, and a differential input signal (IN1, IN2) is applied across nodes 203 and 204. The differential input signal (IN1, IN2) is coupled to the input of the amplifier circuit (240). The amplifier circuit (240) is arranged to generate a differential output signal (OUT1, OUT2) at nodes 205 and 206 in response to the differential input signal (IN1, IN2) from nodes 203 and 204.

Circuit 200 does not require AC coupling capacitors as was described in FIG. 1. Instead, the differential input signal (IN1, IN2) is directly coupled to the input of amplifier circuit 240 and to the input terminals of signal detector 250. However, circuit 200 will also work with AC coupled inputs in a similar arrangement as FIG. 1. Switching circuits S1 and S2 are arranged to be selectively activated and deactivated in response to a control signal (CTL) at node 211.

When a valid signal is present at the differential input (IN1, IN2) of the line driver circuit (200), the signal detector circuit (250) will force switching circuits S1 and S2 into an open circuit position via control signal CTL at node 211. Current source circuits 221 and 222 have no effect on the output signal at nodes 205 and 206 when switching circuits S1 and S2 are in their open circuit position.

If the signal detector circuit (250) does not detect a valid signal (i.e., an invalid signal is present or no signal is present) at nodes 203 and 204, then signal detector circuit 250 forces switching circuits S1 and S2 into a closed circuit position via control signal CTL at node 211. Activation of switching circuits S1 and S2 forces an offset into the output of the amplifier circuit (240). The current (IOffset1) from current source 221 will force the voltage at node 205 (OUT1) to increase in value (sometimes referred to as "pulling up"). The current (IOffset2) from current source 222 will force the voltage at node 206 to decrease in value (sometimes referred to as "pulling down").

The offset generated by current sources 221 and 222 at nodes 205 and 206 via switching circuits 231 and 232 are determined independent from the input signal. Valid signals applied at nodes 203 and 204 are relatively large when compared to noise. When a small noise signal (e.g., an invalid signal) is present at nodes 203 and 204, the noise signal will not be large enough when gained up by the amplifier circuit (240) to allow the output to switch, affecting blocking the noise signal from effecting the output.

The current levels IOffset1 and IOffset2, which are generated by current source circuits 221 and 222, can either be small or large depending upon the desired effect. In one example, a small current is utilized by the current source circuits (221 and 222) to allow a large enough input signal to pass through. In another example, a larger current can be utilized to block all input signals so that the entire line driver is "muted".

The current source circuits 221 and 222 can be replaced by voltage sources in some implementations so that the voltage at nodes 205 and 206 are coupled to the voltage sources. The voltage sources can be regulated voltage sources, or programmable voltage sources such as via a DAC circuit. In some other implementations the current levels (IOffset1 and IOffset2) are programmable such as via a current DAC. In still some other implementations, current source circuit 222 can be coupled to node 205 and current source circuit 221 can be coupled to node 206 so that the applied offset currents are applied in an opposite direction to that illustrated in FIG. 2. In still other examples, only one current is applied to one of the nodes (e.g., 205 or 206) with a single current source circuit (e.g., 221 or 222). In still other examples, only a single voltage source is coupled to one of the output nodes (either 205 or 206) to force one output node to a desired voltage level.

Example Timing Diagram

Figure 3:
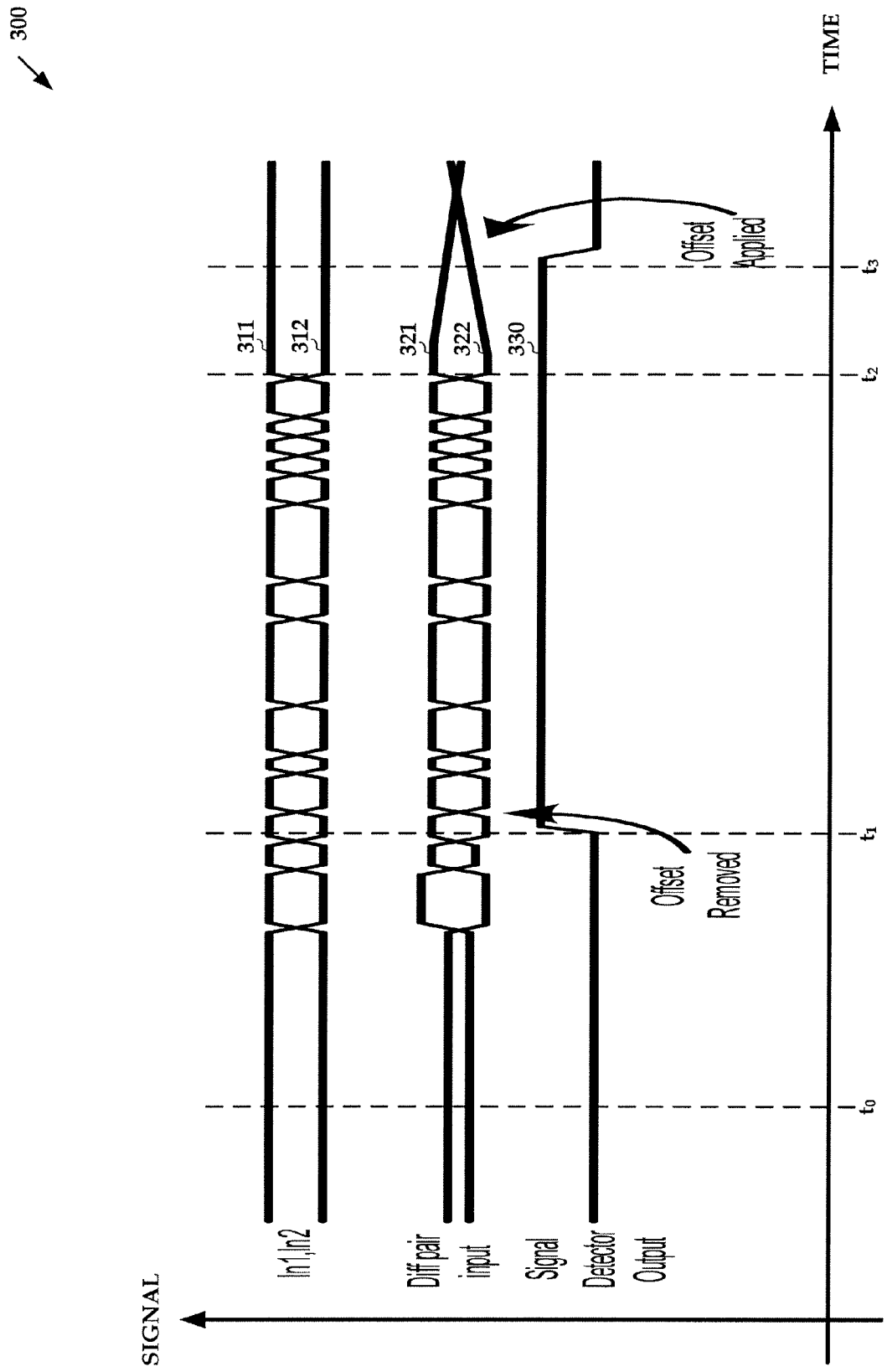
FIG. 3 is an illustration of an example timing diagram for the operation of a line driver circuit.

FIG. 3 is an illustration of an example timing diagram (300) for the operation of a line driver circuit that is arranged in accordance with at least some aspects of the present disclosure.

Timing diagram 300 illustrates a differential input signal (311, 312), a differential pair input signal (321, 322), and a detector output signal (330). From times $t_0$ through $t_1$ the detector signal output (330) is low indicating that an offset is being applied to the differential pair input signals (321, 322) when compared to the differential input signal (311, 312). At time $t_1$ the offset is removed from the differential pair input signal since a valid signal is detected at the input of the amplifier circuit (e.g., see FIG. 1). A valid signal continues between times $t_1$ and $t_2$. At time t2, the input signal ceases to toggle between values, indicating that the valid input is no longer available. Between times t2 and t3, the values associated with the deferential pair input signal (321, 322) begin to drift. At time t3, the signal detector circuit determines that no valid signal is present at the input of the amplifier circuit and an offset is again applied to the differential pair input signal (321, 322).

Example Signal Detector Circuits

Figure 4:
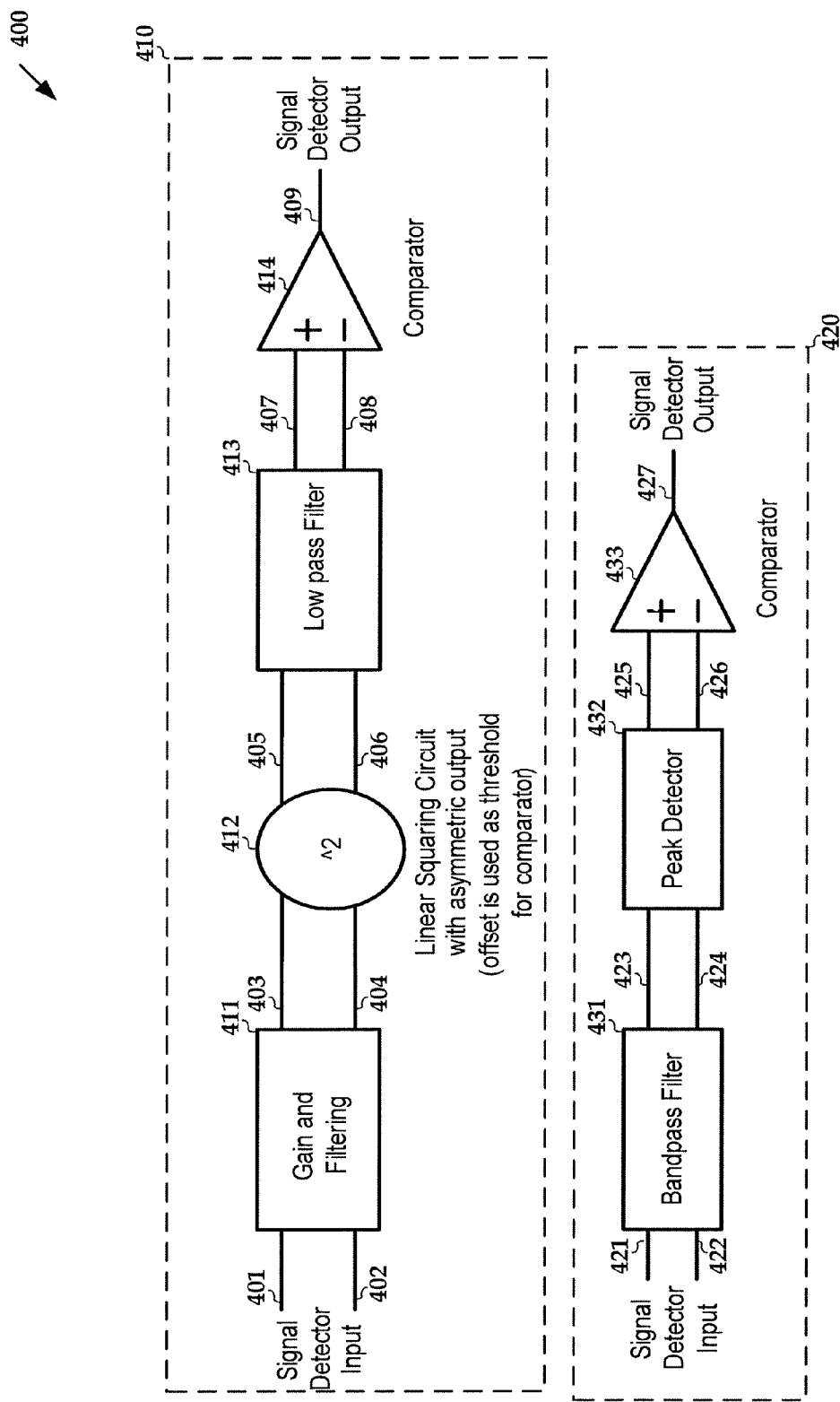
FIG. 4 is a schematic diagram illustrating example signal detector circuits.

FIG. 4 is a schematic diagram (400) illustrating example signal detector circuits that are arranged in accordance with at least some aspects of the present disclosure.

A first signal detector circuit (410) includes a gain and filtering circuit (411), a linear squaring circuit (412), a low pass filter circuit (413), and a comparator circuit (414). The gain and filtering circuit (411) includes a first input terminal coupled to node 401, a second input terminal coupled to node 402, a first output terminal coupled to node 403, and a second output terminal coupled to node 404. The linear squaring circuit (412) includes a first input terminal coupled to node 403, a second input terminal coupled to node 404, a first output terminal coupled to node 405, and a second output terminal coupled to node 406. The low pass filter circuit (413) includes a first input terminal coupled to node 405, a second input terminal coupled to node 406, a first output terminal coupled to node 407, and a second output terminal coupled to node 408. The comparator circuit (414) includes a non-inverting input terminal coupled to node 407, an inverting input terminal coupled to node 408, and an output terminal coupled top node 409.

An input signal is applied across nodes 401 and 402 as a signal detector input. The gain and filtering circuit (411) is arranged to increase the signal levels and optionally filter a portion of the frequency spectrum associated with the input signal, which is then provided as an input to the linear squaring circuit (412). The linear squaring circuit (412) is arranged to provide an asymmetrical output that corresponds to a square of the signal from nodes 403 relative to node 404. The low pass filter circuit (413) is arranged to generate an output signal at nodes 407 and 408 that is a filtered version of the signal from nodes 405 and 406 so that high frequency signals are ignored. The comparator circuit (414) is arranged to evaluate the output of the low pass filter circuit (413) and generate the signal detector output signal based on the difference between the voltages at nodes 407 and 408. The offset that is generated by the linear squaring circuit (412) is used by the comparator circuit (414) as a threshold trip point for the signal detector output signal.

A second signal detector circuit (420) includes a bandpass filter circuit (431), a peak detector circuit (432), and a comparator circuit (433). The bandpass filter circuit (431) includes a first input terminal coupled to node 421, a second input terminal coupled to node 422, a first output terminal coupled to node 423, and a second output terminal coupled to node 424. The peak detector circuit (432) includes a first input terminal coupled to node 423, a second input terminal coupled to node 424, a first output terminal coupled to node 425, and a second output terminal coupled to node 426. The comparator circuit (433) includes a non-inverting input terminal coupled to node 425, an inverting input terminal coupled to node 426, and an output terminal coupled top node 427.

An input signal is applied across nodes 421 and 422 as a signal detector input. The bandpass filter circuit (431) is arranged to pass a limited band of the frequency spectrum associated with the input signal, which is then provided as an input to the peak detector circuit (432). The peak detector circuit (432) is arranged to provide an output signal across nodes 425 and 426 that indicates when a peak level above some predetermined threshold is achieved at node 423 relative to node 424. The comparator circuit (433) is arranged to evaluate the output of the peak detector circuit (432) and generate the signal detector output signal based on the difference between the voltages at nodes 425 and 426.

Example Line Driver System

Figure 5:
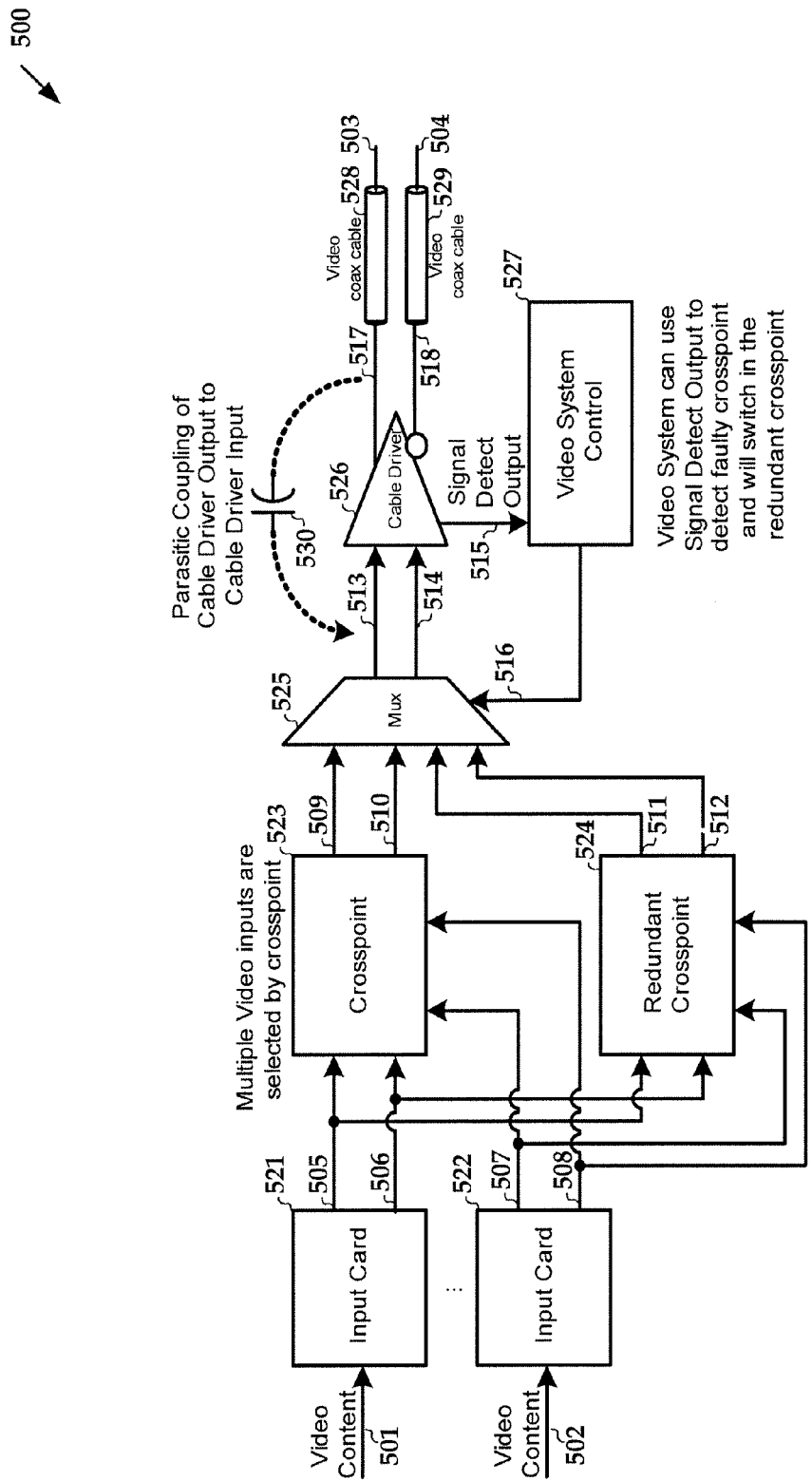
FIG. 5 is a schematic diagram illustrating an example line driver system that employs a line driver circuit, all arranged in accordance with at least some aspects of the present disclosure circuit.

FIG. 5 is a schematic diagram illustrating an example line driver system (500) that employs a line driver circuit arranged in accordance with at least some aspects of the present disclosure.

Line driver system 500 includes a multiplicity of input cards (521-522), a crosspoint switch circuit (523), a redundant crosspoint switch circuit (524), a multiplexer circuit (525), a cable driver circuit (526), a video system control circuit (527), and a pair of coaxial transmission lines (528, 529). Input card 521 includes an input terminal coupled to node 501, and an output terminal pair coupled to nodes 505 and 506. Input card 522 includes an input terminal coupled to node 502, and an output terminal pair coupled to nodes 507 and 508. Crosspoint circuit 523 includes a first input terminal pair at nodes 505 and 506, a second input terminal pair at nodes 507 and 508, and an output terminal pair at nodes 509 and 510. Redundant crosspoint circuit 524 includes a first input terminal pair at nodes 505 and 506, a second input terminal pair at nodes 507 and 508, and an output terminal pair at nodes 511 and 512. Multiplexer circuit 525 includes a first input terminal pair at nodes 509 and 510, a second input terminal pair at nodes 511 and 512, a control terminal at node 516, and an output terminal pair at nodes 513 and 514. Cable driver circuit 526 includes an input terminal pair at nodes 513 and 514, a signal detection output terminal at node 515, and an output terminal pair at nodes 517 and 518. Video system control circuit 527 includes an input terminal that node 515 and an output terminal at node 516. Node 517 is coupled to the first coaxial transmission line (528), while node 518 is coupled to the second coaxial transmission line (529). The output of the coaxial transmission lines correspond to nodes 503 and 504, respectively.

In operation, video content (i.e. video broadcast signals) are coupled to nodes 501 and 502. The first input card (521) and the second input card (522) each generate a respective pair of output signals after equalizing and otherwise processing their respective video signals from nodes 501 and 502. Although FIG. 5 illustrates two input cards (521, 522), any arbitrary number of input cards is equally applicable. The processed video signals from each input card (521, 522) are then coupled to both the crosspoint circuit (523) and the redundant crosspoint circuit (524) via nodes 505-508. The crosspoint circuits (523, 524) are arranged to dynamically select between different video feeds from the output of the input cards. The crosspoint can be used to select different video feed signals for each local region so that local broadcasting is custom tailored for local news, local sports, local commercials etc. The redundant crosspoint circuit (524) is arranged the same as the crosspoint circuit (523), and can be used as a backup to the crosspoint (523) in the event of a failure.

The multiplexer circuit (525) is arranged to select a video signal feed from either one of the crosspoint switches at nodes 509-512 based on the control signal that is provided at node 516, and also arranged to couple the selected video signal feed to the input lines of the cable driver circuit (526) at nodes 513-514. The cable driver circuit (526) is arranged with an internal signal detector circuit as previously described with respect to FIGS. 1-4. The cable driver circuit (526) drives a pair of video lines such as the depicted coaxial transmission lines (528, 529) so that a video signal is received at nodes 503 and 504 based on the input signals at lines 513 and 514.

A parasitic coupling is observed internal to the cable driver circuit (526) as is illustrated by capacitor 530. The capacitive coupling is observed from the output lines of the cable driver at nodes 517 and 518 back to the input lines at nodes 513 and 514. In some instances a crosspoint circuit (523) may fail and the signal lines at nodes 513 and 514 include an invalid signal (e.g., noise). In such a situation, the signal lines at nodes 513 and 514 may receive noise from any variety of sources (e.g., parasitic coupling from the output lines, parasitic coupling from the input lines, thermal noise, etc.). The invalid signal levels are detected in the cable driver circuit (526) and provided as a detection signal that is sent to the video system control circuit (527) via the signal detect output terminal at node 515. The video system control circuit (527) is arranged to use the detection signal to identify the faulty crosspoint condition and switch the multiplexer circuit (525) to the redundant crosspoint circuit (524) by asserting a multiplexer control signal at node 516. Once the redundant crosspoint circuit (524) is selected, the video content is delivered to the coaxial transmission lines (528, 529). In other examples, the detection signal is used to enable an offset adjustment as previously described with respect to FIGS. 1 and 2.

The above specification, examples and data provide a complete description of the manufacture and use of the composition of the invention. Since many embodiments of the invention can be made without departing from the spirit and scope of the invention, the invention resides in the claims hereinafter appended.

I claim:

1. An apparatus for driving a transmission line pair in response to a differential input signal, the apparatus comprising:
   an amplifier circuit that includes a differential input terminal and a differential output terminal, wherein the differential input terminal is coupled to a first node and a second node, and wherein the differential output terminal is coupled to the transmission line pair at a third node and a fourth node;
   a signal detector circuit that is coupled to the differential input terminal across the first node and the second node, wherein the signal detector circuit is arranged to assert a control signal at a first logic level when an invalid signal is identified at the differential input terminal, and wherein the signal detector circuit is arranged to assert the control signal at a second logic level when an valid signal is identified at the differential input terminal; and
   an offset generator circuit that is coupled to either the differential input terminal or the differential output terminal, wherein the offset generation circuit is arranged responsive to the control signal from the signal detector circuit such that the offset generation circuit is activated when the control signal is asserted at the first logic level.

2. The apparatus of claim 1, wherein the differential input signal is AC coupled to the differential input terminal of the amplifier circuit via a pair of capacitor circuits.

3. The apparatus of claim 2, wherein the offset generator circuit comprises a first switching circuit and a second switching circuit, wherein the first switching circuit is arranged to couple a first voltage to the first node when the control signal corresponds to the first logic level, and wherein the second switching circuit is arranged to couple a second voltage to the second node when the control signal corresponds to the first logic level.

4. The apparatus of claim 3, wherein the offset generator circuit further comprises a third switching circuit and a fourth switching circuit, wherein the third switching circuit is arranged to couple a third voltage to the first node when the control signal corresponds to the second logic level, and wherein the fourth switching circuit is arranged to couple the third voltage to the second node of the differential input terminal when the control signal corresponds to the first logic level.

5. The apparatus of claim 3, wherein the offset generation circuit further comprises a resistor ladder circuit that is coupled between a first power supply terminal and a second power supply terminal, wherein the first voltage is provided at a first tap-point in the resistor ladder circuit, and wherein the second voltage is provided at a second tap-point in the resistor ladder circuit.

6. The apparatus of claim 3, wherein the offset generation circuit further comprises at least one member of the group comprising: a voltage divider circuit, a resistor ladder circuit, a diode based divider circuit, and a mixed resistor-diode ladder circuit.

7. The apparatus of claim 3, wherein the offset generation circuit further comprises at least one member of the group comprising: a DC voltage regulator, a series voltage regulator, a shunt regulator, a voltage doubler, a bandgap voltage reference, a vbe multiplier, and a digital-to-analog converter (DAC) circuit.

8. The apparatus of claim 3, wherein each of the first switching circuit and the second switching circuit are each implemented as a transistor switching circuit from at least one member of the group comprising: a field effect transistor (FET), a metal oxide semiconductor field effect transistor (MOSFET), a junction field effect transistor (JFET), and a bipolar junction transistor (BJT).

9. The apparatus of claim 1, wherein the signal detector circuit is at least one member of the group comprising: an energy detection circuit, a filter circuit, and a peak detector circuit.

10. The apparatus of claim 1, wherein the signal detector circuit comprises: a linear squaring circuit and a comparator circuit, wherein the linear squaring circuit is arranged to generate an asymmetrical output signal in response to signals sensed across the first node and the second node, and wherein the comparator circuit is arranged to generate the control signal when the asymmetrical output signal crosses a threshold of the comparator circuit.

11. The apparatus of claim 1, wherein the signal detector circuit comprises: a peak detector circuit and a comparator circuit, wherein the peak detector circuit is arranged to generate a peak detect output signal in response to signals sensed across the first node and the second node, and wherein the comparator circuit is arranged to generate the control signal when the peak detect output signal crosses a threshold of the comparator circuit.

12. The apparatus of claim 1, wherein the offset generator circuit comprises a first switching circuit and a second switching circuit, wherein the first switching circuit is arranged to couple a first signal to the third node when the control signal corresponds to the first logic level, and wherein the second switching circuit is arranged to couple a second signal to the fourth node when the control signal corresponds to the first logic level.

13. The apparatus of claim 12, the offset generator circuit further comprising a first current source and a second current source, wherein the first current source is coupled to the first switching circuit such the first signal corresponds to a first current, and wherein the second current source is coupled to the second switching circuit such that the second signal corresponds to a second current.

14. The apparatus of claim 13, wherein each of the first current source and the second current source corresponds to a current digital-to-analog converter (DAC) such that the first current and the second current are programmable by the current DAC.

15. The apparatus of claim 12, the offset generator circuit further comprising a first voltage source and a second voltage source, wherein the first voltage source is coupled to the first switching circuit such the first signal corresponds to a first voltage, and wherein the second voltage source is coupled to the second switching circuit such that the second signal corresponds to a second voltage.

16. The apparatus of claim 15, wherein each of the first voltage source and the second voltage source corresponds to a digital-to-analog converter (DAC) such that the first voltage and the second voltage are programmable by the DAC.

17. An apparatus for driving a transmission line pair in response to a differential input signal, the apparatus comprising:
a first capacitor circuit that is arranged to AC couple a first portion of the differential input signal to a first node;
a second capacitor circuit that is arranged to AC couple a second portion of the differential input signal to a second node;
an amplifier circuit that includes a differential input terminal and a differential output terminal, wherein the differential input terminal is coupled to across the first node and the second node, and wherein the differential output terminal is coupled to the transmission line pair at a third node and a fourth node;
a signal detector circuit that is coupled to the differential input terminal across the first node and the second node, wherein the signal detector circuit is arranged to assert a control signal at a first logic level when an invalid signal is identified at the differential input terminal, and wherein the signal detector circuit is arranged to assert the control signal at a second logic level when an valid signal is identified at the differential input terminal; and
an offset generator circuit that is coupled to at least one of the first node and the second node, wherein the offset generation circuit is arranged responsive to the control signal from the signal detector circuit such that the offset generation circuit is activated when the control signal is asserted at the first logic level.

18. The apparatus of claim 17, wherein the offset generator circuit is arranged such that: a first voltage that is selectively coupled to the first node when the control signal is asserted at the first logic level, a second voltage is selectively coupled to the second node when the control signal is asserted at the first logic level, and a third voltage corresponds to a common mode voltage is selectively coupled to both the first node and the second node when the control signal is asserted at the second logic level.

19. The apparatus of claim 17, wherein the offset generator circuit is arranged such that: a first signal is selectively coupled to the third node when the control signal is asserted at the first logic level, a second signal is selectively coupled to the fourth node when the control signal is asserted at the first logic level, and the offset generator circuit is decoupled from the third and fourth nodes when the control signal is asserted at the second logic level.

20. An apparatus for driving a transmission line pair in response to a differential input signal, the apparatus comprising:
a first capacitor circuit that is arranged to AC couple a first portion of the differential input signal to a first node;

a second capacitor circuit that is arranged to AC couple a second portion of the differential input signal to a second node;

an amplifier circuit that includes a differential input terminal and a differential output terminal, wherein the differential input terminal is coupled to across the first node and the second node, and wherein the differential output terminal is coupled to the transmission line pair at a third node and a fourth node;

a signal detector circuit that is coupled to the differential input terminal across the first node and the second node, wherein the signal detector circuit is arranged to assert a control signal at a first logic level when an invalid signal is identified at the differential input terminal, and wherein the signal detector circuit is arranged to assert the control signal at a second logic level when an valid signal is identified at the differential input terminal; and an offset generator circuit that is coupled to at least one of the third node and the fourth node, wherein the offset generation circuit is arranged responsive to the control signal from the signal detector circuit such that the offset generation circuit is activated when the control signal is asserted at the first logic level.

* * * * *

UNITED STATES PATENT AND TRADEMARK OFFICE
CERTIFICATE OF CORRECTION

PATENT NO.         : 7,538,589 B2
APPLICATION NO. : 11/924565
DATED                : May 26, 2009
INVENTOR(S)       : Robert Karl Butler It is certified that error appears in the above-identified patent and that said Letters Patent is hereby corrected as shown below:

Column 7, line 23: "affecting" should read "effecting"

Column 7, line 24: "effecting" should read "affecting"

Column 12, line 9 claim 15: "such the first signal" should read "such that the first signal"

Column 13, line 6 claim 20: "to across" should read "to"

Signed and Sealed this

Twenty-ninth Day of September, 2009

David J. Kappos
*Director of the United States Patent and Trademark Office*